(12) United States Patent  
Pistner et al.

(10) Patent No.: US 8,437,593 B2  
(45) Date of Patent: May 7, 2013

(54) MOBILE RADIO STATION AND HYBRID CABLE FOR A MOBILE RADIO STATION

(75) Inventors: Thomas Pistner, Duisburg (DE); Frank Falke, Willich (DE); Dirk Schnare, Düsseldorf (DE); Uwe Lonitz, Meerbusch (DE); Karsten Gehrke, Bergkamen (DE)

(73) Assignee: Vodafone Holding GmbH, Dusseldorf (DE)

( * ) Notice: Subject to any disclaimer, the term of this patent is extended or adjusted under 35 U.S.C. 154(b) by 321 days.

(21) Appl. No.: 12/392,314

(22) Filed: Feb. 25, 2009

(65) Prior Publication Data

US 2009/0215492 A1    Aug. 27, 2009

(30) Foreign Application Priority Data

Feb. 25, 2008   (DE) .......................... 10 2008 010 929

(51) Int. Cl.
*G02B 6/44*   (2006.01)

(52) U.S. Cl.
USPC ........................... 385/101; 455/561; 174/68.1

(58) Field of Classification Search .................. 455/561; 439/577; 385/75, 98
See application file for complete search history.

(56) References Cited

U.S. PATENT DOCUMENTS 5,293,678 A * 3/1994 Chamberlain et al. ....... 29/401.1
5,467,420 A * 11/1995 Rohrmann et al. ........... 385/101
5,557,698 A * 9/1996 Gareis et al. .................. 385/101
6,151,482 A   11/2000 Eriksson et al.
7,105,739 B2 * 9/2006 Abe ................................ 174/28

FOREIGN PATENT DOCUMENTS

EP   1391897 A1 * 2/2004
JP   2006-235263   * 9/2006

* cited by examiner

*Primary Examiner* — Jany Tran
(74) *Attorney, Agent, or Firm* — International IP Law Group, LLPC

(57) ABSTRACT

There is provided a hybrid cable that comprises a coaxial cable with an outer conductor and a hollow inner conductor that encloses an inner space. The hybrid cable according to an exemplary embodiment of the present invention may comprise a data line that is arranged in the inner space of the inner conductor.

1 Claim, 3 Drawing Sheets

US 8,437,593 B2

MOBILE RADIO STATION AND HYBRID CABLE FOR A MOBILE RADIO STATION

CROSS REFERENCE TO RELATED APPLICATION

This application claims priority to German (DE) Patent Application No. 10 2008 010 929.0-34, filed on Feb. 25, 2008, the contents of which are incorporated by reference as if set forth in their entirety herein.

BACKGROUND

An exemplary embodiment of the present invention relates to cables for transmitting electrical and optical signals, especially with coaxial cables.

In contrast to mobile radio stations used up until now, so-called Remote Radio Head (RRH) stations have the advantage that a lower transmission capacity is needed since the high-frequency transmitter is situated much closer to the antenna and consequently only a shorter high-frequency line to the antenna is needed. This fact increases the efficiency of the mobile radio station substantially. Moreover, the transmitter mast of an RRH station can be installed up to several hundred meters away from the base station.

The term remote radio head is used in mobile radio technology to refer to the outdoor and weather-proof installation of the power supply, the transmitter and receiver module, the output amplifier and the filters on the antennas. The communication with the base station is usually effectuated via a fiberglass connection.

Up until now, the structure of RRH mobile radio stations with remote high-frequency transmitters has been expensive in comparison to conventionally constructed mobile radio systems since a power supply line and a data line had to be installed. So far, this is only cost-effective in the case of fairly long cables. However, an RRH mobile radio system entails considerable cost advantages in comparison to a conventionally constructed mobile radio system during ongoing operation.

In the state of the art, cables are known in which several types of conductors are combined in order to lower installation costs or in cases where exceptional difficulties have to be overcome.

German Utility Model DE 20 2007010626 U1 discloses a data-energy hybrid line. This hybrid line is intended for applications in high-frequency shielded areas and it combines electrically shielded direct voltage lines with potential-free optical fibers in one cable. U.S. Pat. Appln. 2003/0121694 A1 discloses a cable in which a power line, a data line and a control line are combined into a single cable having a shared sheathing.

The cables known from the state of the art, however, are not suitable for facilitating the conversion of existing mobile radio stations to modern RRH technology.

SUMMARY OF THE INVENTION

Before this backdrop, an exemplary embodiment of the present invention may lower the point at which RRH mobile radio systems become cost-effective.

In order to achieve this objective, an exemplary embodiment of the present invention may relate to a hybrid cable.

A hybrid cable according to an exemplary embodiment of the present invention comprises a coaxial cable with an outer conductor and a hollow inner conductor that encloses an inner space. The hybrid cable according to an exemplary embodiment of the present invention may be characterized in that a data line is arranged in the inner space of the inner conductor.

In an exemplary embodiment of the present invention, the data line may be configured as an optical and/or electrical data line.

Another exemplary embodiment of the present invention may relate to creation of an RRH mobile radio system that is more cost-effective than known RRH mobile radio systems. This may be achieved by a mobile radio system with a hybrid cable according to an exemplary embodiment of the present invention.

Finally, an exemplary embodiment of the present invention may relate to a method for the installation and production of a hybrid cable. A method according to an exemplary embodiment of the present invention comprises the following steps:

introduction of a data line into the inner space of a hollow inner conductor of a coaxial cable and connecting the inner conductor and the outer conductor to a power supply.

The above-mentioned and additional advantages, special aspects and practical refinements of the invention are also elucidated on the basis of the exemplary embodiments which will be described below with reference to the figures.

DETAILED DESCRIPTION OF SPECIFIC EMBODIMENTS

An exemplary embodiment of the present invention relates to a hybrid cable. The hybrid cable may be useful in connection with a mobile radio station.

Figure 1:
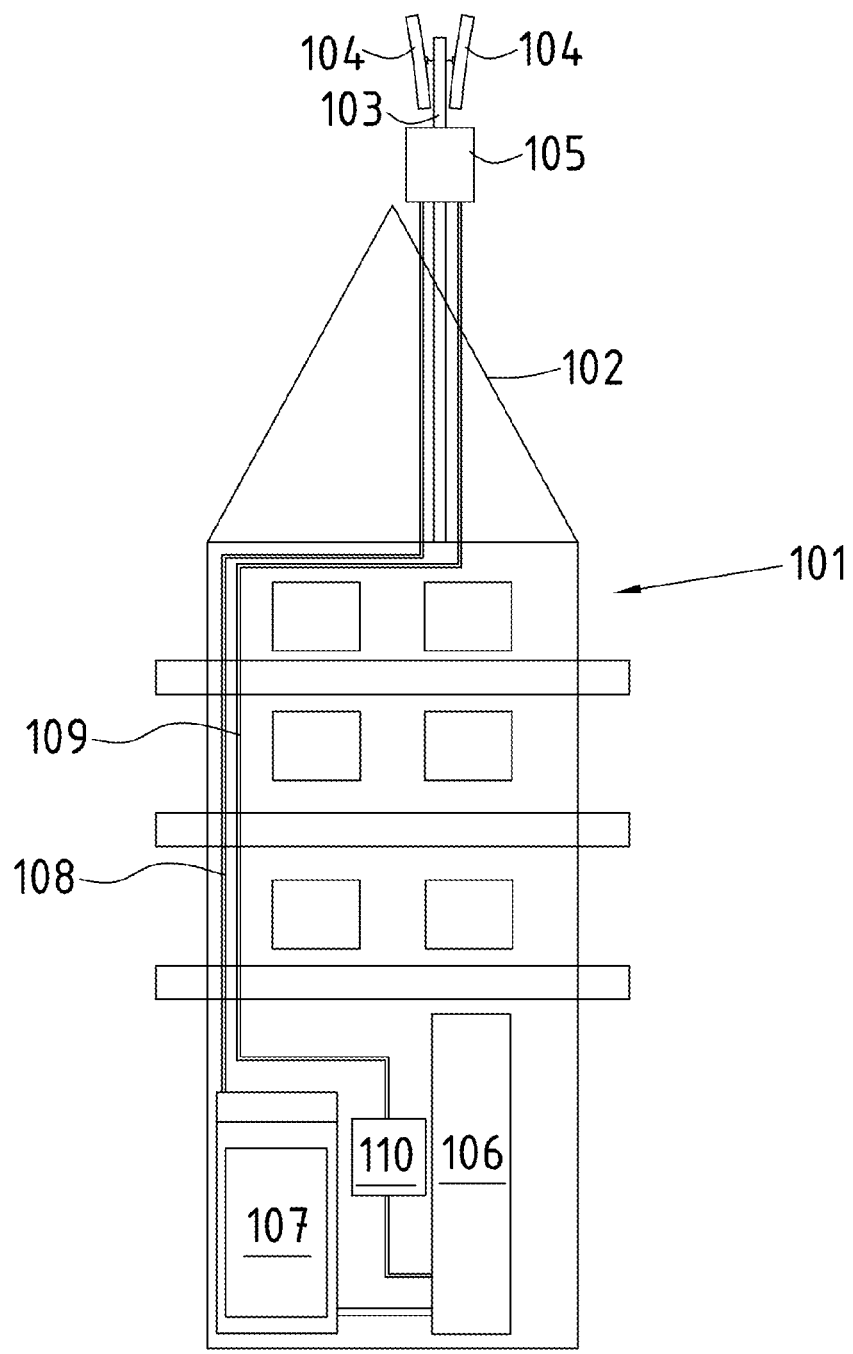
FIG. 1 is a perspective view of an RRH mobile radio system.

FIG. 1 schematically shows a mobile radio system that is installed in a tall building 101. On the roof 102 of the building 101, there is a mast 103 on which several antennas 104 are installed. A high-frequency transmitter 105 is installed on the mast 103 in the immediate vicinity of the antennas 104. The high-frequency transmitter 105 is also referred to as a remote radio head (RRH) 105. A power supply 106 for the system is installed in the lower section of the building 101, for example, in the basement or on the ground floor. A so-called base station 107 with a radio server is accommodated along with the power supply 106. As far as the signals are concerned, the base station 107 is connected to the RRH 105 via a data line 108 for purposes of data exchange. Typically, the data line 108 is an optical data cable for transmitting optical data. Moreover, a power line 109 leads from the power supply 106 to the RRH 105. The power line 109 is typically a 48-volt current connection. In the conventional manner, a fuse box 110 is installed between the power supply 106 and the RRH 105.

As an alternative to the exemplary embodiment of the mobile radio system shown in FIG. 1, the mobile radio system can also be installed in a tower or on a tall mast.

In contrast to the mobile radio station shown in FIG. 1, conventional mobile radio systems that are not equipped with an RRH 105 have the high-frequency transmitter in the lower section of the building or at the foot of a mast on which the antennas 104 of the mobile radio system are arranged. In the conventional mobile radio systems, the high-frequency transmitter is only connected to the antennas via coaxial cables.

Consequently, when it comes to RRH mobile radio systems, in addition to the coaxial cables that have been installed until now in mobile radio sites, additional optical cables have to be installed for the construction of mobile radio systems of the new generation. Moreover, a 48-volt power connection has to be installed in order to supply the remote radio heads that are near the antennas.

Up until now, when a new mobile radio system was built or when an existing one was modernized, there was a need to install a separate data line as well as a cable for supplying power to the RRH. As a result, costly work has to be carried out on the cable routes, especially in terms of fire protection, the wall openings have to be enlarged, etc., so that today, RRH systems are only cost-effective in the case of fairly long cables.

This is where an exemplary embodiment of the present invention endeavors to provide a remedy. Moreover, an exemplary embodiment of the present invention may relate to using the coaxial cable that is already present in a manner as well that is both different and new.

Figure 2:
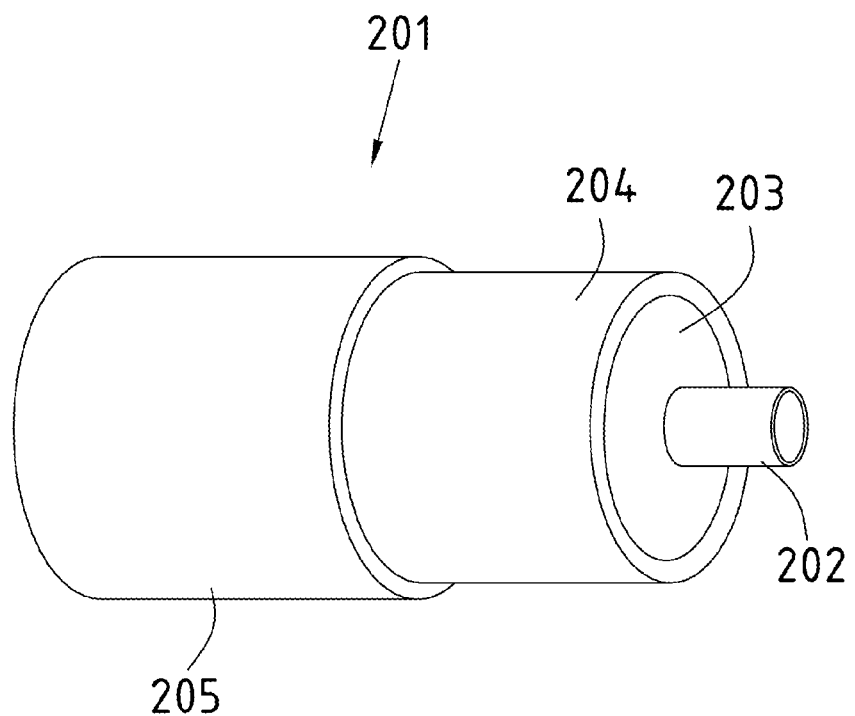
FIG. 2 is a perspective cross sectional view of a hybrid cable according to an exemplary embodiment of the present invention.

FIG. 2 shows a coaxial cable 201. From the inside to the outside, the coaxial cable 201 has an inner conductor 202 made of copper, which is configured to be hollow and which encloses a space. The inner conductor 202 is surrounded by a dielectric 203. The dielectric 203 is surrounded by an outer conductor 204, which is insulated by a protective jacket 205 and protected against external damage.

In conventional mobile radio systems, the high-frequency cable that connects the high-frequency transmitter to the antennas has a hollow copper inner conductor when its diameter is more than ⅞" (2.2 cm). In an exemplary embodiment of the present invention, the data line 108 is installed in the hollow inner conductor 202 of the coaxial cable 201. Thus, the antenna cable 201, which has already been installed in the mobile radio system, is used, in a manner of speaking, as an empty conduit for installing the data line 108 needed for the RRH 205.

This approach for converting already existing mobile radio stations to the new RRH technology has a number of advantages. These include especially a simplified installation and thus the possibility to cut costs, since no new cable routes have to be built. For example, it is avoided that new wall openings have to be created. Moreover, the additional data line 108 does not have to be tied in place. Furthermore, no additional measures have to be carried out in terms of fire protection. After all, the sensitive data lines 108 inside the coaxial cable 201 are very well-protected against external influences, for example, also against attack by rodents.

The coaxial cable 201 can also be used as a power cable 109 for the 48-volt power supply of the RRH 105 in that the inner conductor 202 and the outer conductor 204 are connected to the appropriate terminals of the power supply 106 and of the RRH 105.

Figure 3:
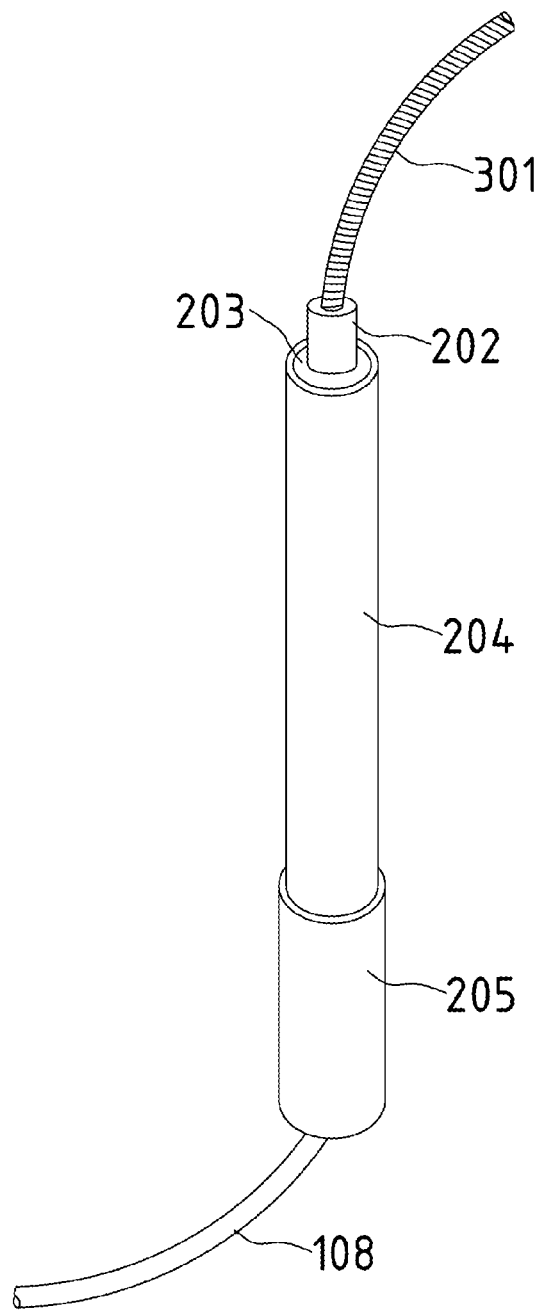
FIG. 3 is a perspective view of a hybrid cable according to an exemplary embodiment of the present invention.

FIG. 3 illustrates how a data cable 108 is pulled into a coaxial cable 201. Completely analogously as with a conventional empty conduit installation, a tube spiral 301, for example, is used to pull the data line 108 into the hollow space of the inner conductor 202.

Thanks to the proposed utilization of the already installed coaxial cable 201 for the power supply, existing mobile radio stations can be converted to the new RRH technology much less expensively.

List of Reference Numerals

101 building
102 roof
103 mast
104 antennas
105 remote radio head (RRH), high-frequency transmitter
106 power supply
107 base station
108 data line
109 power line
110 fusebox
201 coaxial cable
202 inner conductor
202 hollow inner conductor
203 dielectric
204 outer conductor
205 protective jacket
301 tube spiral

The invention claimed is:
1. A method for converting an existing mobile radio station comprising a base station, a power supply, an antenna and a coaxial cable as an antenna cable into a remote radio head station, further comprising a remote radio head, the method comprising:
introducing a data line into a hollow space of a hollow inner conductor of a coaxial cable, said coaxial cable has already been installed as an antenna cable in the mobile radio station, and said hollow inner conductor of the coaxial cable is used as an empty conduit for installing the data line needed for operating the remote radio head using a tube spiral to pull the data line into the hollow space of the inner conductor, wherein the data line is configured as an optical and/or electrical data line and the inner conductor and an outer conductor are connected to the power supply to use the coaxial cable as a power cable for the power supply.

* * * * *